United States Patent Office 3,472,782
Patented Oct. 14, 1969

---

3,472,782
HALOGEN-CONTAINING DIPHENYL ETHERS
Kurt A. Nowotny, Rock Hill, Mo., assignor to Monsanto Company, St. Louis, Mo., a corporation of Delaware
No Drawing. Original application Sept. 21, 1964, Ser. No. 398,093, now Patent No. 3,371,120, dated Feb. 27, 1968. Divided and this application Apr. 3, 1967, Ser. No. 683,034
Int. Cl. C09k *3/02, 3/00;* C07c *43/28*
U.S. Cl. 252—78                                         9 Claims

ABSTRACT OF THE DISCLOSURE

The method of operating a hydraulic device wherein a hydraulic fluid is employed, said fluid being a compound represented by the structure

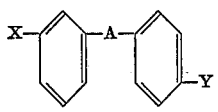

where A is selected from the group consisting of oxygen and sulfur and X and Y are each selected from the group consisting of bromine and chlorine.

---

This application is a division of applicant's co-pending application Ser. No. 398,093, filed Sept. 21, 1964, now Patent No. 3,371,120.

This invention relates to certain novel ethers and sulfides (thioethers) and particularly to such ethers and sulfides in which the halogen substituents, which can be bromine or chlorine, are in the 3,4'- positions.

Thus, the present invention relates to the following compounds:

3-bromo-4'-bromodiphenyl ether; 3-bromo-4'-bromodiphenyl sulfide, 3 - bromo - 4' - chlorodiphenyl ether; 3-bromo - 4' - chlorodiphenyl sulfide, 4-bromo-3'-chlorodiphenyl ether; 4-bromo-3'-chlorodiphenyl sulfide, 3-chloro-4'-chlorodiphenyl ether; and 3-chloro-4'-chlorodiphenyl sulfide.

The novel compounds of this invention are useful as electronic coolants, atomic reactor coolants, diffusion pump fluids, synthetic lubricants, damping fluids, bases for greases, force transmission fluids (hydraulic fluids) and as filter mediums for air conditioning systems.

Of the foregoing uses the compounds of this invention are particularly well suited for use as hydraulic fluids per se or as base stock components for hydraulic fluid compositions because of their unique and unexpected wide liquid range. In determining liquid range melting points were determined by crystallizing the test compound, usually by cooling to −40° F., and then heating the crystallized compound until melting occurred. Generally, crystallizing points cannot be easily determined because the claimed compounds readily supercool. In general, however, melting points and crystallizing points correspond. For example, 4,4'-dichlorodiphenyl ether has a melting point of about 86° F. (30° C.) and the substitution of a bromine atom for one of the chlorine atoms to give 4-bromo-4'-chlorodiphenyl ether causes an increase in melting point to about 109° F. (43° C.). This increase in melting point is to be expected, of course, due to the increase in size of the bromine atom as compared to the chlorine atom. This effect is further demonstrated by the fact that 4,4'-dibromodiphenyl ether has a melting point of about 141° F. (60.5° C.). Also 3-bromo-3'-chlorodiphenyl ether has a melting point of about 63° F. (17° C.), 3,3'-dichlorodiphenyl ether has a melting point of about 54° F. (12° C.) and 3,3'-dibromodiphenyl ether has a melting point of 82.4° F. (28° C.). It was quite unexpected, therefore, to find that bromine- and/or chlorine-containing dihalogenated diphenyl ethers wherein the halogens are in the 3,4'-positions have melting points extremely far below the melting points of the 3,3'- and 4,4'-dihalogenated diphenyl ethers. Similarly, the 3,4'-dihalogenated diphenyl sulfides have unexpectedly lower melting points as compared to the 3,3'- and 4,4'-dihalogenated diphenyl sulfides.

As indicative of the uniqueness of the compounds of this invention, 4-bromo-3'-chlorodiphenyl ether, for example, has a melting or crystallizing point of −8° F. (−22° C.), 3-bromo-4'-chlorodiphenyl ether has a melting point of 7° F. (−14° C.) and 3,4'-dichlorodiphenyl ether has a melting point of 14° F. (−10° C.). Similar differences occur in the analogous sulfur compounds, 3,4'-dichlorodiphenyl sulfide, for example, has a melting point 144 F. lower than 4-bromo-4'-chlorodiphenyl sulfide which melts at 230° F. (110° C.).

The ethers of this invention can be prepared by reacting an alkali metal halophenate with a dihalobenzene or by the Ullman reaction and the claimed sulfides can be prepared by reacting an alkali metal halothiophenate with a dihalobenzene in a carboxamide or N-alkyl pyrrolidone. Typical examples of the preparation of the novel compounds of this invention are given below in which parts are parts by weight.

EXAMPLE 1

Into a suitable reaction vessel fitted with an agitator, reflux condenser and thermometer and having external heating means there was charged 212.1 parts of m-chlorophenol and 84.2 parts of potassium hydroxide followed by the addition of 150 ml. of toluene. The resulting mixture is heated to complete formation of the potassium chlorophenolate while removing, azeotropically, 34 ml. of water. The toluene is then stripped and 500 ml. of diglyme is added. There is then charged to a different reaction vessel 707.7 parts of p-dibromobenzene, 5 parts of cuprous chloride and 3 parts of potassium iodide. The resulting mixture is heated to 165° C. and then the phenolate previously prepared is slowly charged over about one and one-half hours. After completing the phenolate addition, the reaction mass is held at 165° C. for an additional five hours. The diglyme is then stripped and the residue diluted with ether, washed with 10% caustic solution and water and dried. The purified residue is then fractionated to provide the desired 4-bromo-3'-chlorodiphenyl ether which has a melting point of −8° F., boiling point of 130° C. at 0.4 mm. of Hg and an index of refraction, $n_D^{25}$ of 1.6138.

EXAMPLE 2

Into a suitable reaction vessel containing 944 parts of m-dibromobenzene there was slowly charged a solution of potassium phenate in diglyme (prepared by dissolving 122 parts of potassium hydroxide in 257.1 parts of p-chlorophenol and removing the water formed by distillation using toluene), 6 parts of cuprous chloride and 4 parts of potassium iodide. The resulting mixture was heated at 165° C., with agitation, for about five hours after which the diglyme was removed by distillation by heating the mixture at reduced pressure. The residue remaining was then taken up in ether and the solids removed by filtration. The ether solution was then washed with 10% caustic solution followed by washing with water, and dried. The ether was then evaporated and the residue fractionated to give the desired product, 3-bromo-4'-chlorodiphenyl ether, which had a boiling range of 128° C. at 0.2 mm. of Hg, a melting point of 7° F. (−14° C.) and an index of refraction, $n_D^{25}$ of 1.6130.

EXAMPLE 3

In the manner of the previous examples, the potassium salt of m-chlorophenol was reacted with p-dichlorobenzene to provide 3,4'-dichlorodiphenyl ether which had a boiling point of 113° C. at 0.5 mm. of Hg, a melting point of 14° F. (−10° C.) and an index of refraction, $n_D^{25}$ of 1.5950.

EXAMPLE 4

Into a suitable reaction vessel there was charged 289.3 parts of p-chlorothiophenol, 944 parts of m-dibromobenzene and 200 ml. of N-methylpyrrolidone and the resulting mixture was heated to 150° C. There was then charged 123.4 parts of potassium hydroxide in 500 ml. of ethanol, which boils off as it is added, after which the reaction mixture was heated at reflux for about eleven hours. The reaction mass was then cooled, taken up in ether and filtered. The filtrate was washed with dilute caustic solution, then with water, and dried. The residue was then fractionated to provide 3-bromo-4'-chlorodiphenyl sulfide which had a boiling point of 147° C. at 0.2 mm. of Hg, a melting point of 104° F. (40° C.), and an index of refraction, $n_D^{25}$ of 1.6608.

EXAMPLE 5

In the manner of Example 4, 147 parts of p-chlorothiophenol, 441 parts of m-dichlorobenzene and 56.1 parts of potassium hydroxide were reacted in N-methylpyrrolidone to provide 3,4'-dichlorodiphenyl sulfide which had a boiling point of 127° C. at 0.4 mm. of Hg, a melting point of 86° F. (30° C.) and an index of refraction, $n_D^{25}$ of 1.6454.

It is interesting to note that for many of their aforementioned uses the compounds of this invention which contain one bromine atom and one chlorine atom possess a unique combination of fire resistance and viscosity. Thus, such compounds are as fire resistant or have the ability to impart as much fire resistance as chlorinated diphenyl ethers and sulfides containing at least three chlorine atoms but do not suffer from the problem of having high viscosities at low temperatures which is common to such trichlorinated compounds and which problem is further magnified with compounds containing more than three chlorines. The chlorine- and bromine-containing compounds are, therefore, preferred moieties of the instant invention because such combination of fire resistance and good low temperature viscosities make them particularly well suited for use as hydraulic fluids, electronic coolants and the like where wide variations in temperature are likely to be encountered.

While this invention has been described by reference to various specific examples and embodiments, it is to be understood that the invention is not limited thereto and that it can be variously practiced within the scope of the following claims.

The embodiments of the invention in which an exclusive property or privilege is claimed are defined as follows:

1. In the method of operating a hydraulic pressure device wherein a displacing force is transmitted to a displaceable member by means of a hydraulic fluid, the improvement which comprises employing as said hydraulic fluid a compound represented by the structure

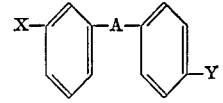

where A is selected from the group consisting of oxygen and sulfur and X and Y are each selected from the group consisting of bromine and chlorine.

2. The method of claim 1 wherein the hydraulic fluid is a compound represented by the structure

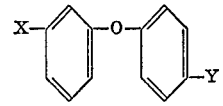

where X and Y are each selected from the group consisting of bromine and chlorine.

3. The method of claim 1 wherein the hydraulic fluid is a compound represented by the structure

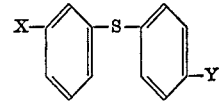

where X and Y are each selected from the group consisting of bromine and chlorine.

4. The method of claim 1 wherein the hydraulic fluid is 4-bromo-3'-chlorodiphenyl ether.

5. The method of claim 1 wherein the hydraulic fluid is 4-bromo-3'-chlorodiphenyl sulfide.

6. The method of claim 1 wherein the hydraulic fluid is 3-bromo-4'-chlorodiphenyl ether.

7. The method of claim 1 wherein the hydraulic fluid is 3-chloro-4'-chlorodiphenyl ether.

8. The method of claim 1 wherein the hydraulic fluid is 3-bromo-4'-chlorodiphenyl sulfide.

9. The method of claim 1 wherein the hydraulic fluid is 3,4'-dichlorodiphenyl sulfide.

References Cited

UNITED STATES PATENTS 3,072,728   1/1963   Kosmin et al. _____ 260—612

FOREIGN PATENTS 1,327,189   4/1963   France.

LEON D. ROSDOL, Primary Examiner

S. D. SCHWARTZ, Assistant Examiner

U.S. Cl. X.R.

252—54, 75, 48.8; 260—609, 612